INVENTORS
JOHN D. EVES
ROBERT M. ENGELBRECHT

BY

ATTORNEYS 3,041,092
PIVOTAL JOINT CONNECTION
John D. Eves, Cortland, N.Y., and Robert Martin
Engelbrecht, Rock Hill, N.J., assignors to The Brewer-Titchener Corporation, Cortland, N.Y., a corporation of New York
Filed Apr. 29, 1958, Ser. No. 731,812
1 Claim. (Cl. 287—14)

This invention relates generally to joint connections, and more particularly to those joint connections designed for the purpose of connecting structural members at a point while allowing rotation of the members relative to one another about that point.

In many applications, it is necessary to fix two structural members in space relative to one another and at the same time allow for relative rotation of the members about the point of juncture. Frequently, when such a junction is made, structural members are weakened at the point of juncture so that their load carrying capacity is reduced. Knowing this, it is necessary for the designer to take this into account when designing and specifying the structural members thereby increasing the difficulty of computing the necessary strengths.

Heretofore, many joint connections have been designed with the intention of joining structural members without weakening their load carrying capacity and allowing freedom of motion so that the members can rotate about the point of juncture. However, none of these has heretofore been completely satisfactory.

The invention herein disclosed has as its principal object the furnishing of a pivotal joint connection which does not weaken the structural members which are joined and which will maintain the structural members in relative position with respect to one another.

Another object of this invention is to provide a pivotal joint connection which will maintain the structural members relative to one another at a point in space while allowing the structural members to rotate about that point.

A further object of this invention is to provide a pivotal joint connection which is easy to use and apply, and which will decrease original design difficulties and also allow for operation over a long period of time without maintenance or repairs.

A pivotal joint connection embodying the invention and the manner of using the same is described herein as used in a folding chair design. However, it should be understood that the pivotal joint connection described and claimed herein can be used in connection with other structural members. The description herein refers to the drawings in which:

Figure 1:
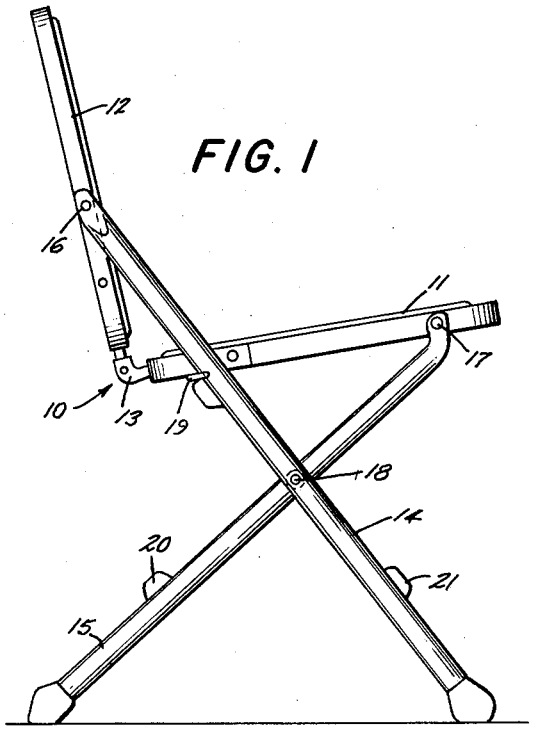
FIG. 1 is a side elevation of a folding chair utilizing the pivotal joint connection which is the subject of this invention.

A folding chair utilizing the pivotal joint connection which is the subject of this invention is shown in FIG. 1 and designated therein generally by the numeral 10. The folding chair consists of seat member 11 and back member 12 pivotally joined by hinge member 13 at the rear thereof.

The chair is shown in FIG. 1 in the opened position and maintained as such by legs 14 and 15 which are connected thereto. Leg 14 is a long leg and connected at its uppermost end to back 12 at pivotal connection 16, while leg 15 is a shorter leg connected at its uppermost end to seat 11 at pivotal connection 17. Pivotal connections 16 and 17 can be of the type described and claimed herein or any other type pivotal connection.

The pivotal connection which illustrates the invention claimed herein is pivotal connection 18 which joins leg members 15 and 14 at the point where they cross. Stop member 19 against which an edge of leg 14 abuts aids in maintaining legs 14 and 15 in position. These legs being joined by connection 18 are maintained in position relative to one another. However, the pivotal join connection 18 allows relative rotation of the legs 14 and 15 about pivotal connection 18 as will be explained below.

In order to maintain the chair in balance when it is in the opened position as shown in FIG. 1, additional legs 14a and 15a, not shown, and additional stop means 19a are necessary and attached to the opposite edge of seat 11 and back 12. Thus, leg 15a, not shown, is attached at its uppermost end to seat 11 by a pivotal connection and joined with leg 15 by cross-brace 20 and leg 14a is attached at its uppermost end to the edge of seat 12 at a pivotal connection and attached to leg 14 by means of cross-brace 21. Leg 15a cannot be seen in FIG. 1 since leg 15 blocks it from view and leg 14a cannot be seen in FIG. 1 since leg 14 blocks it from view while stop 19a cannot be seen in FIG. 1 since it also is blocked from view.

Figure 2:
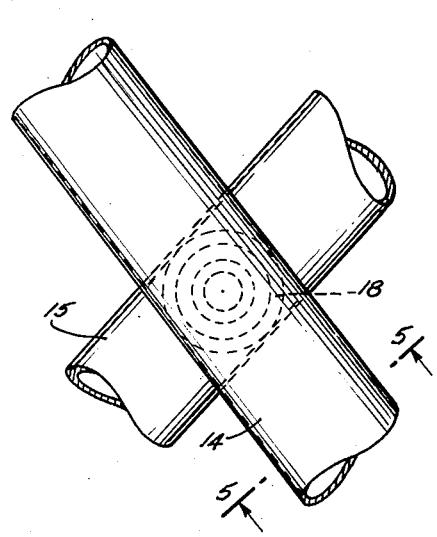
FIG. 2 is a segmentary view of the chair shown in FIG. 1 illustrating in detail the pivotal joint connection utilized therein.
Figure 3:
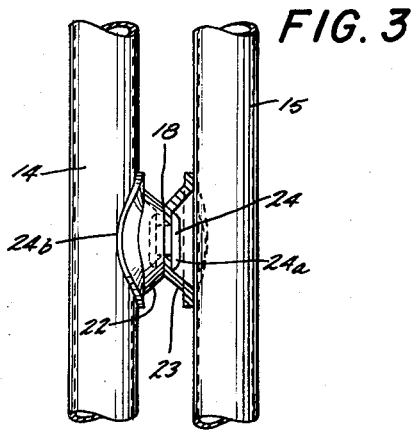
FIG. 3 is a segmentary view of the chair shown in FIG. 1 illustrating in further detail the pivotal joint connection utilized therein.

The pivotal joint connection 18 is shown in greater detail in FIGS. 2 and 3. Juncture 18 consists essentially of spacer members 22 and 23 which are connected by rivet 24, and which are fastened each to one of the legs. Other pivotal connecting means may be utilized and rivet 24 is shown herein by way of example only. As seen in the drawings, spacer 22 is fastened at its periphery to leg 14. Spacer 23 is fastened at its periphery to leg 15.

Figure 4:
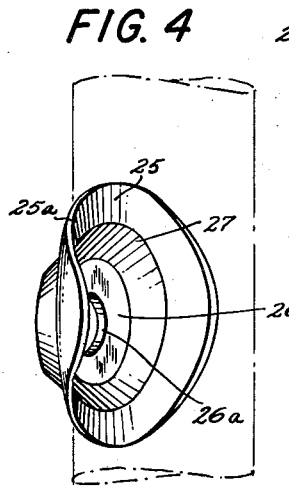
FIG. 4 is a perspective view of one of the spacers used in the pivotal joint hinge connection.

One of the identical spacers is shown in perspective view in FIG. 4. Therein, it is seen that the spacer is generally circular with flange 25 surrounding it and circular ridge portion 26 is joined to flange 25 by means of wall 27 which forms a connecting envelope providing an enclosure beneath the ridge portion.

Flange 25 is the portion of the spacer member which is attached to the structural member to be connected which is leg 14 or 15, and ridge portion 26 is the portion of the spacer which is riveted to the second spacer used to form the hinge combination.

As seen in FIG. 4, the spacer has hole 26a formed therein which extends from the top of ridge 26 through to the enclosure. Hole 26a is provided for the rivet and as shown in FIG. 3, rivet 24 extends through identical holes in identical spacers and heads 24a and 24b of rivet 24 prevent the displacement of the rivet from its position within the holes.

Wall portion 27 must be of sufficient dimension so that the head of the rivet when applied to the spacer can be maintained within the enclosure formed by wall 27 and ridge 26 so that the head of the rivet does not touch the leg or structural member which is attached to the spacer.

When two spacers are joined by means of the rivet as shown in the drawings, they can rotate relative to one another although they are fixed at a single point by means of the connecting rivet, and when the flanges of the spacers are attached to structural members such as 14 and 15, the structural members 14 and 15 are maintained in position with respect to one another in space but can rotate about the point of juncture forming a pivotal joint connection.

The flange of the spacer is joined to the structural member by welding or any other suitable means which does not pierce or deform the structural member and therefore, it is not weakened.

Figure 5:
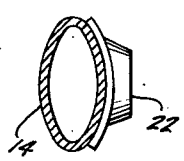
FIG. 5 is a sectional view taken along the lines 5—5 in the direction of the arrows as indicated in FIG. 2 showing the elliptical cross-section of the structural members used in the chair illustrated in FIG. 1.

In this embodiment, hollow elliptical cross-section structural members as shown in FIG. 5 are joined together. However, it is not necessary that the structural members be elliptical in nature. They may be circular or have any other suitable cross-section.

It is also noted that the spacer members utilized herein are formed with slight indentures in the peripheral flange 25 such as circular indenture 25a which allows the peripheral flange to fit snugly against the elliptical cross-section leg member 14 or 15. If a circular elliptical cross-section structural member were used, a slightly different indenture would be formed in peripheral flange 25.

Thus, among others, the several objects of the invention as specifically aforenoted, are achieved. Obviously, numerous changes in construction and re-arrangement of parts might be resorted to without departing from the spirit of the invention as defined by the claim.

We claim:

A pivotal connection for legs of a folding chair comprising a pair of legs of said chair, each of said legs being substantially tubular in cross-section, identical spacing members disposed between said legs and being associated with a leg, said spacing members being located at points opposed to one another on opposite legs, each of said spacing members comprising a substantially conical wall and a flange defining a bearing surface extending radially inwardly from one end of said conical wall, the bearing surfaces being in intimate contact with one another, the flanges being provided with apertures extending therethrough in substantial alignment with each other, each of said spacing members including a peripheral flange extending substantially outwardly from the other end of the associated conical wall and formed with a surface adjacent a portion of its respective leg, each of the peripheral flanges having a diameter greater than the diameter of its associated bearing surface, means permanently attaching each of the peripheral flanges to its respective legs, and a rivet means extending through each of the apertures and cooperating to maintain the bearing surfaces in intimate contact with one another whereby said legs are free to pivot with respect to each other.

References Cited in the file of this patent

UNITED STATES PATENTS

| | | |
|---|---|---|
| 1,835,473 | Davidson | Dec. 8, 1931 |
| 1,864,160 | Williams | June 21, 1932 |
| 1,907,459 | Stowell | May 9, 1933 |
| 2,060,171 | Burton | Nov. 10, 1936 |
| 2,569,632 | Hauck | Oct. 2, 1951 |
| 2,876,027 | Sulmonetti | Mar. 3, 1959 |

FOREIGN PATENTS

| | | |
|---|---|---|
| 636,594 | Great Britain | May 3, 1950 |
| 696,894 | Great Britain | Sept. 9, 1953 |